United States Patent [19]

Larsen et al.

[11] 4,324,409
[45] Apr. 13, 1982

[54] SLED BODY AND ADJUSTABLE ATTACHMENT MEANS FOR SNOW SKIS

[75] Inventors: Ronald A. Larsen, Arlington Hts.; Gustav F. Schmid, Palatine, both of Ill.

[73] Assignee: Schmid Tool & Engineering Corp., Franklin Park, Ill.

[21] Appl. No.: 178,564

[22] Filed: Aug. 15, 1980

[51] Int. Cl.³ .............................................. B62B 13/00
[52] U.S. Cl. .............................. 280/12 F; 280/12 AB
[58] Field of Search .............. 280/12 R, 12 F, 12 AA, 280/12 AB, 601, 607, 618, 633, 809; 211/605 K; 224/917

[56] References Cited

U.S. PATENT DOCUMENTS

| 2,316,456 | 4/1943 | Robes, Jr. ............... | 280/12 F X |
| 3,675,938 | 7/1972 | Sigl ......................... | 280/607 X |

FOREIGN PATENT DOCUMENTS

| 2408170 | 8/1975 | Fed. Rep. of Germany .... | 280/12 F |
| 2527322 | 12/1976 | Fed. Rep. of Germany .... | 280/12 F |
| 54545 | 10/1934 | Norway ......................... | 280/12 F |
| 87264 | 2/1956 | Norway ......................... | 280/12 F |
| 621483 | 2/1981 | Switzerland ................... | 280/607 |

Primary Examiner—Joseph F. Peters, Jr.
Assistant Examiner—Donald W. Underwood
Attorney, Agent, or Firm—McCaleb, Lucas & Brugman

[57] ABSTRACT

A sled body apparatus having an adjustable attachment device for connection to the conventional ski bindings mounted on a pair of snow skis and which can be adapted to connect to the bindings of both downhill and cross-country skis. The attachment device of the preferred embodiment includes adjustable front and rear segments which can be individually pre-positioned relative to the sled body to allow connection to substantially any desired size and style of ski binding. Alternatively, the adjustable attachment device can be utilized to mount a pair of snow skis to a backpack frame for carrying the skis, or to convert a pair of skis into an equipment carrier by using an appropriate sled body frame.

9 Claims, 10 Drawing Figures

SLED BODY AND ADJUSTABLE ATTACHMENT MEANS FOR SNOW SKIS

BACKGROUND OF THE INVENTION

1. Field of the Invention

This invention relates to snow skis and sled devices, and more particularly to adjustable attachment means for connecting a pair of snow skis to a sled, backpack frame, or carrying frame apparatus.

2. Description of the Prior Art

There have been prior attempts to convert snow skis into stretchers and sled devices for the transporting of injured skiers, knapsacks, and other items. Such prior art devices are typified by U.S. Pat. Nos. 2,203,909; 2,314,293; and 2,316,456. However, none of these prior art structures utilize the ski bindings present on the skis. Instead, they require additional specialized hardware to connect the backpack frame or stretcher frame to a pair of skis, or to connect an equipment carrier to the skis.

Normally snow skis are only used for their intended purpose, namely, with ski boots to ski over the snow. At other times snow skis are stored as they are not useful for other purposes. Moreover, in view of the ever increasing desire to conserve energy, the use of snow skis is becoming even less frequent, especially in those areas where persons are required to travel long distances to reach satisfactory downhill ski facilities.

It is desirable then to make snow skis a multi-purpose leisure item, as currently there is no satisfactory manner by which conventional snow skis, whether of the downhill or cross-country variety, can be easily converted into a temporary equipment carrier or sled device.

SUMMARY OF THE INVENTION

The present invention overcomes the deficiencies of the prior art by providing a sled apparatus having a sled body and adjustable attachment members for detachable mounting to the conventional ski bindings of snow skis. Each adjustable attachment member comprises a sole plate capable of being selectively adjusted to a particular desired setting so that it can be readily connected to a particular size or type of ski binding. In use, the pre-adjusted sole plates can be simply snap-fitted into and out of engagement with the existing ski bindings of a pair of snow skis. A configured sled body seat mounts atop the attachment members. A steering and braking mechanism mounts on the sled seat to provide the necessary control in use. Thus, the snow skis, adjustable attachment members and sled seat cooperate to form a sled apparatus for sliding across the snow, such as for use on downhill or even small inclines. Alternatively, the sled seat can be replaced with an equipment frame for use as an equipment carrier or emergency stretcher. Additionally, by mounting the adjustable attachment members themselves to a backpack frame, a pair of skis can easily be carried by a hiker.

With the present invention, no specialized fastening hardward is necessary to convert a pair of snow skis into a sled device. Instead, the existing ski bindings are used to effect attachment of the sled body or equipment frame to the skis. Further, because the attachment members are adjustable, there is no need to have different sizes of attachment members. The adjustable attachment members can be pre-adjusted and then used repetitively with a particular pair of skis, or the attachment means can be re-adjusted to mount on another pair of skis having different size bindings. An alternate embodiment of the attachment means is disclosed for use with cross-crountry skis.

Accordingly, it is a principal object of the present invention to provide adjustable attachment means for directly mounting a sled device to the bindings of a pair of snow skis.

It is a further object to provide an equipment carrier or stretcher device having adjustable attachment means which can be mounted to the bindings of a pair of snow skis.

It is yet a further object to provide adjustable attachment means for mounting snow skis to a backpack frame.

The means by which the foregoing and other objects of the present invention are accomplished and the manner of their accomplishment will be readily understood from the following specification upon reference to the accompanying drawings, in which:

FIG. 1 is a rear perspective view of the sled and adjustable attachment means of the present invention as mounted to a pair of downhill snow skis;

FIG. 1-A is a rear view of the snow ski sled device of FIG. 1 with certain ski binding components removed for better viewing;

DESCRIPTION OF THE PREFERRED EMBODIMENT

Figure 1:
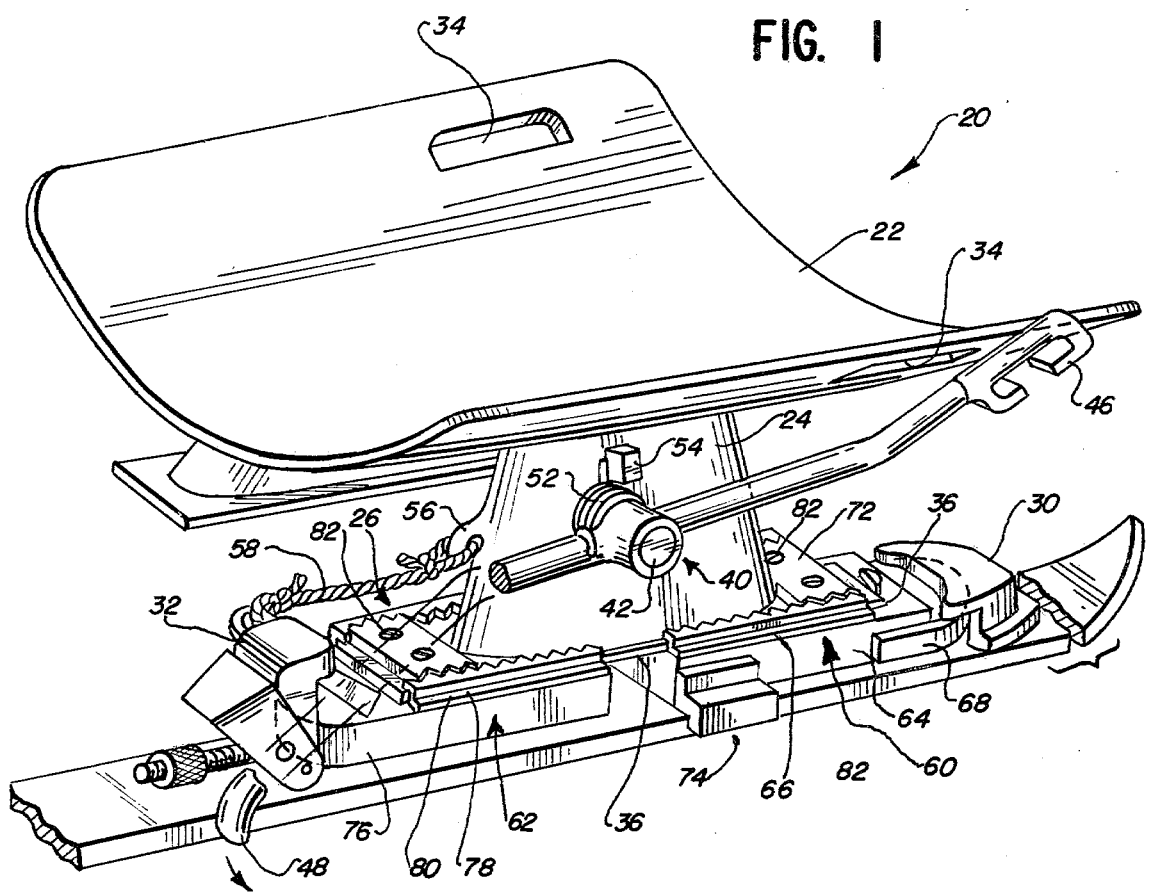
Figure 1A:
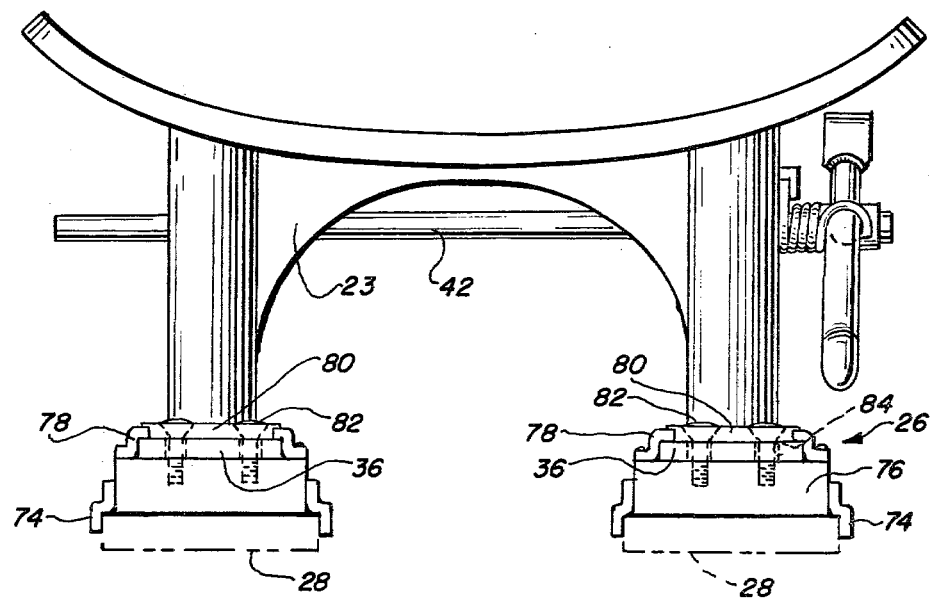
Figure 2:
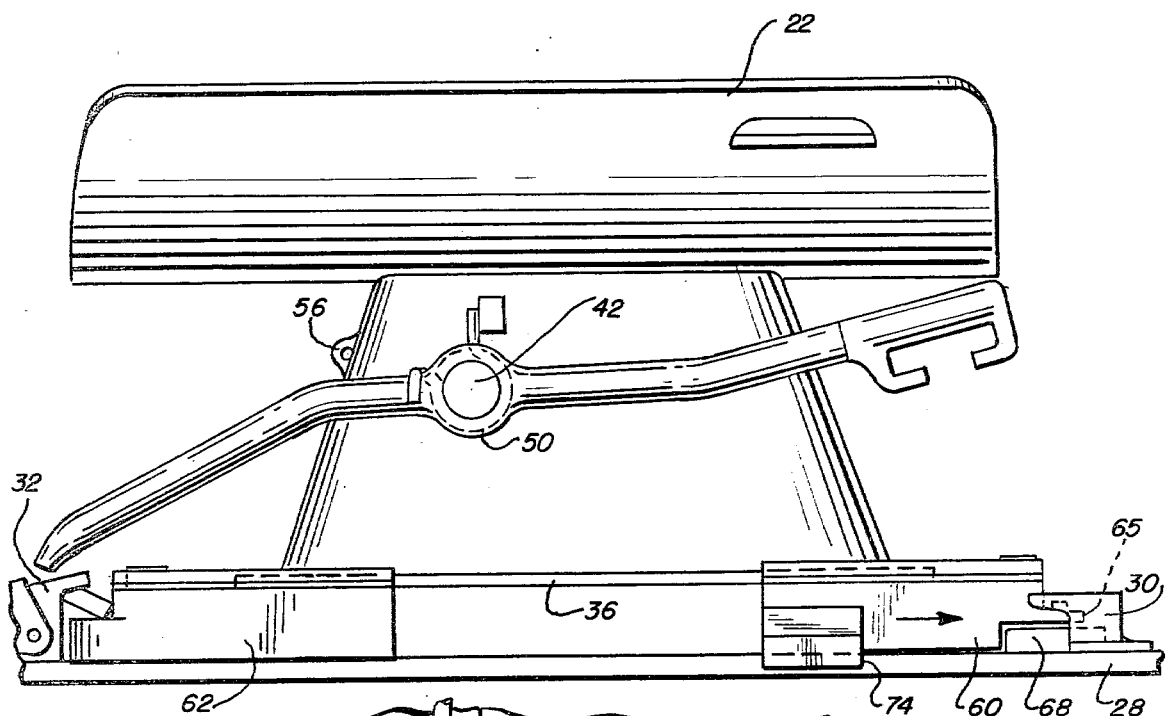
FIG. 2 is an elevation view of the sled device of FIG. 1, with the attachment means depicted in one particular operating position.
Figure 3:
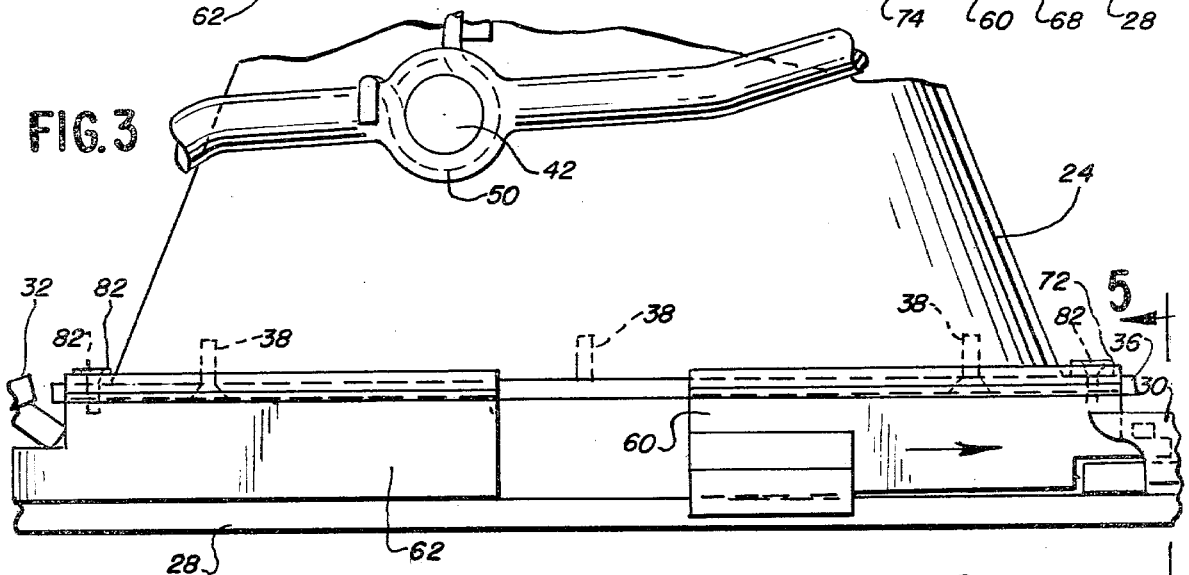
FIG. 3 is an enlarged elevation view, similar to FIG. 2, but depicting the attachment means in an adjusted operating position.
Figure 4:
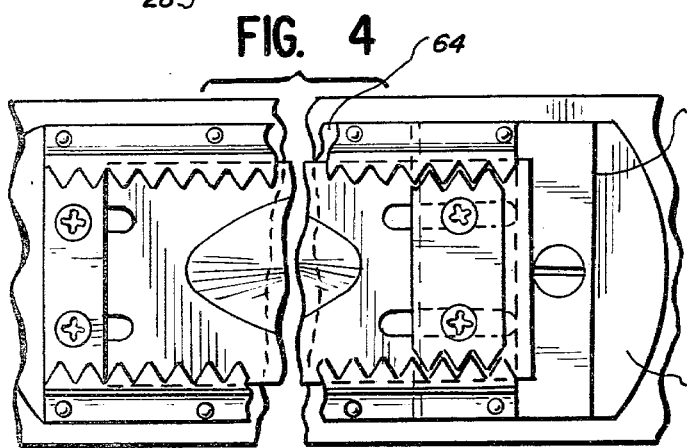
FIG. 4 is a fragmented plan view of the attachment means of the present inventon.
Figure 5:
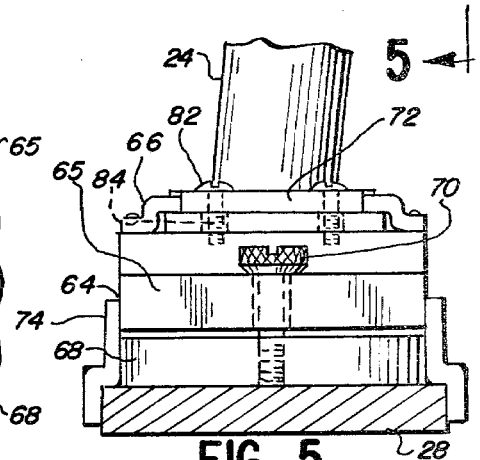
FIG. 5 is a front view of the attachment means, as seen along lines 5—5 of FIG. 3.

Having reference to the drawings, wherein like reference numerals indicate corresponding elements, there is shown in FIG. 1 an illustration of a sled device, generally denoted by reference numeral 20. The sled device 20 comprises a seat body portion 22 and two leg portions 24. Each leg portion 24 terminates in a foot portion which comprises the adjustable attachment means and which is generally denoted by reference numeral 26. As shown in FIG. 1, the sled device 20 is fastened to a pair of conventional downhill or so-called Alpine snow skis 28 having a conventional front ski binding 30 and rear ski binding 32. It will be understood that only one specific form of downhill ski binding (30, 32) is shown in FIGS. 1, 2, and 3; it is known in the trade by the name CUBCO. However, it is to be understood that the present invention can be utilized with substantially any of the other well-known types of ski bindings.

The seat body portion 22 is generally curved so as to allow a person to lie or sit atop it. The seat portion 22 and leg portions 24 are preferably blow-molded from a suitable plastic material, such as polystyrene. Alternatively, these portions could be molded from a suitable fiberglass material, be formed up from a tubular frame and fitted with a plastic mesh seat portion, or be fabricated completely from formed metal sections. However it is formed, the seat body 22 preferably has convenient hand holes 34 for carrying the sled device 20 as well as for gripping during its use as a sled.

Each leg member 24 terminates in a lower base or mounting plate 36. In the preferred embodiment, this mounting plate 36 comprises an elongated thin metal plate fastened by threaded fasteners 38 (FIG. 3) to the underneath side of each leg member 24. The sled device 20 also includes a braking and steering device, preferably of the spring-loaded "dead-man" type, which is generally denoted by reference numeral 40. This control device 40 has a main shaft 42 which is rigidly mounted transversely of the seat portion 22 through each leg portion 24. A brake handle 44 having a hand grip 46 and a brake tip 48 is pivotally mounted by a shoulder 50 to each end of shaft 42. The brake tip 48 is normally urged into engagement with the snow (see arrow in FIG. 1) so as to prevent a runaway sled when the user has fallen off. This is accomplished by a compression spring 52 having one end placed about brake handle 44 and the other end engaging a stop block 54 formed on leg 24. Additionally, a safety ring 56 is formed at the rear of each leg portion 24 for connecting a safety strap 58 to the rear ski binding 32 in a well known manner.

Turning to the adjustable attachment means or sole plate 26 of the preferred embodiment, it essentially is a facsimile of the sole portion of a conventional snow ski boot. However, as seen in FIGS. 1, 3, 4, and 5, the sole plate 26 includes a front, longitudinally adjustable portion 60 for engaging the front ski binding 30 and a rear adjustable portion 62 for engaging the rear ski binding 32. The front portion 60 includes a toe piece body 64 having a forwardly extending lip 65, a serrated guide track 66 rigidly mounted atop portion 64 such as by threaded fasteners, for example, a vertically adjustable toe piece 68, a toe piece adjusting screw 70, a front locking plate 72, and edge guide plates 74. The latter act to loosely grip and contain the edges of ski 28 so as to prevent any unwanted lateral movement and resulting release of the sole plate 26 from the ski bindings 30, 32 during use.

In like fashion, the rear adjusting portion 62 of adjustable attachment means 26 includes a heel piece 76, a rear serrated guide track 78 rigidly mounted atop heel 76, and a rear locking plate 80. The fasteners 82 (FIGS. 3 & 4) pass through elongated holes 84 formed in mounting plate 36 and fasten the locking plates 72, 80 to the front and rear adjusting body portions 60, 62 respectively.

Turning to the operation of the preferred embodiment of the present invention, it will be seen in FIG. 1 that the sled device 20 can be readily adapted to mount to a pair of downhill snow skis 28. First, the adjustable sole plate 26 is pre-adjusted to fit the appropriate length of bindings 30, 32. This is accomplished by loosening the fasteners 82 to allow the locking plates 72, 80 to be temporarily raised. This in turn allows the front and rear adjusting portion 60, 62 to be respectively adjusted to the correct position relative to mounting plate 36 by sliding each of the guide tracks 66, 78 along plate 36. The fasteners 82 are then retightened thereby lockably setting the length of the sole plate 26. Next the toe piece adjusting screw 70 is first unfastened until the adjustable toe piece 68 is adjusted to the proper vertical position so as to engage the front ski binding 30 and then is retightened. With the side channel plates 74 correctly positioned to entrap the side edges of a ski 28, the preadjusted attachment means 26 is mounted to a ski 28 by first placing the toe portion 68 within the front ski binding 30, and they by locking the rear binding 32 against the heel piece 76.

Figure 6:
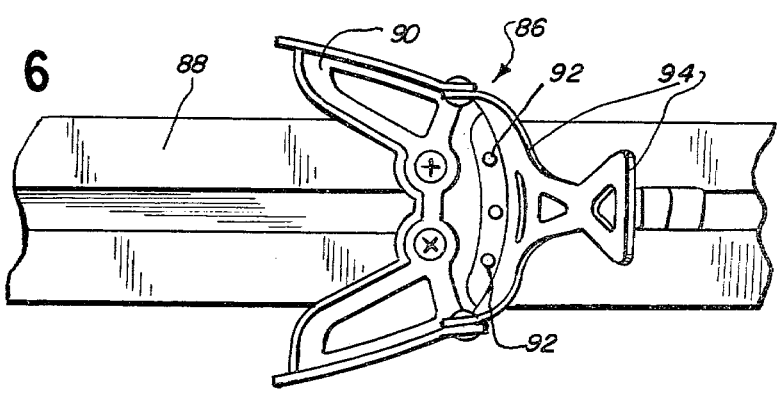
FIG. 6 is a plan view of a typical ski binding for a cross-country ski.

There is shown in FIG. 6 a typical front ski binding for a cross-country or so-called Nordic ski, generally referred to by reference numeral 86. The binding 86 includes a base plate 90 rigidly mounted by fasteners to the ski 88 and three upstanding pins 92 for engagement in a well known manner with mating holes (not shown) in the front sole area of a typical cross-country ski boot (not shown). A top locking plate 94 is pivotally connected to the binding base plate 90 and locks into grooves formed in a ratchet-type clamp 96.

Figure 7:
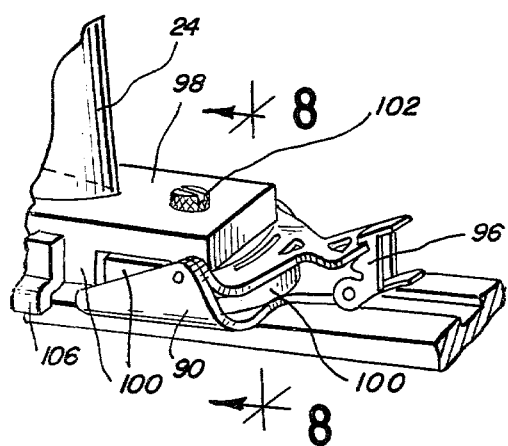
FIG. 7 is a front perspective view of the attachment means of the present invention modified to mount to the cross-country ski binding of FIG. 6.
Figure 8:
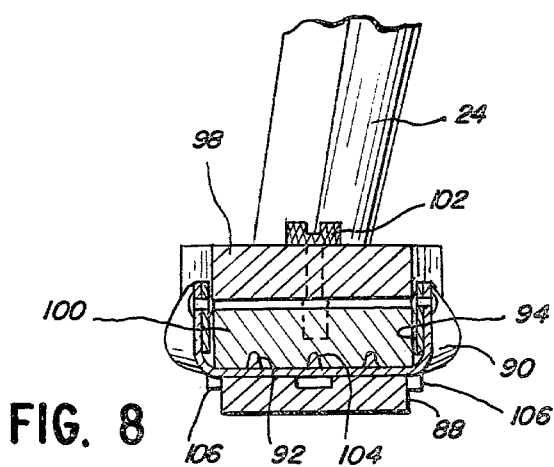
FIG. 8 is a sectional view of the modified attachment means of FIG. 7, as seen along lines 8—8 thereof.

As seen in FIGS. 7 & 8, the sled device 20 of the present invention can be mounted to a cross-country ski 88 with only slight modifications. For use with cross-country skis, the sled device 20 is modified such that each leg 24 is directly mounted to a relatively thick sole plate 98. The modified sole plate 98 has a front adjustable toe piece 100 connected to it by an adjusting screw 102. Similar in fashion to the lower front sole of a typical cross-country ski boot, the lower front edge of the toe piece 100 includes three vertical holes 104 within which the mating pins 92 of the binding base plate 90 can be inserted. It will be understood that the vertically adjustable toe piece 68 of the downhill embodiment of this invention (FIG. 1) could likewise be fitted with holes 104 so that the adjustable attachment means 26 could work with both downhill and cross-country ski bindings. In any event, as seen in FIG. 7, the toe piece 100 and sole plate 98 are clamped to the ski 88 by the locking plate 94. A pair of elongated, downwardly-extending side plates 106 are formed on each side of the base plate 98. These act to laterally maintain the sole plate 98 atop ski 88. The presence of side plates 106, the fact that the sole plate 98 and connected toe piece 100 forms a rigid unit, and the weight of the sled 20 and user combine to assure that any unwanted pivoting of toe piece 100 about binding 86 is restricted. Thus, the sled device 20 when mounted to a cross-country ski 88 operates in similar fashion as when mounted to a downhill ski 28.

Figure 9:
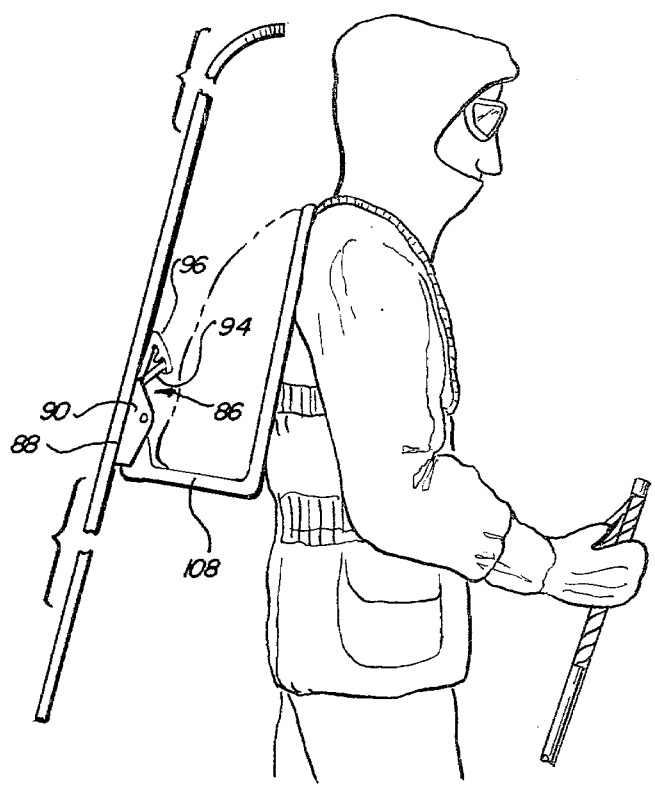
FIG. 9 depicts the attachment means of the present invention mounting a pair of snow skis to a backpack frame.

There is shown in FIG. 9 a person with a backpack frame 108 strapped across his shoulders. The cross-country type sole plate 98 and adjustable toe piece 100 of the alternate embodiment of the present invention are directly mounted by appropriate fasteners to the backpack frame 108. A pair of cross-country skis 88 can then be readily mounted via bindings 86 directly to the backpack frame 108 so as to easily carry the skis. In similar fashion, a pair of downhill snow skis can be carried on the backpack frame 108 through use of the downhill type adjustable attachment means 26 described above.

When used as a sled, the device 20 is used like any other snow sled. Additionally, however, the right and left handles of the dead-man brake 40 can be separately used to turn the direction of the device 20 or, by engagement of both brake ends 48 with the snow, to slow or stop the sled 20. When it is desired to use the snow skis in the conventional manner, the sled device 20 can be easily disconnected from the skis by releasing the ski binding 32 (FIG. 1) or ratchet clamp 96 (FIG. 7). The sled device 20 can then be stored while the skis 28 or 88 can be used again as snow skis. Moreover, the adjustable attachment means 26 (FIG. 1) or plate 98 (FIG. 7) can then be readjusted to fit a different style or length of ski bindings than those depicted as bindings 30, 32 (FIG. 1) or 86 (FIG. 6). It will be understood that the sled device 20 can be used with an existing pair of downhill ski bindings without changing either the boot size setting or lateral release setting of the bindings.

Further, it will be understood that the sled device 20, whether attached to downhill or cross-country skis, can be used to haul equipment lashed to the seat portion 22. Alternatively, the latter can be replaced by an appropriately-formed equipment carrier (not shown), such as a box-like device to haul wood, for example.

Because the attachment means 26 (and 98) of the present invention rigidly positions the attached snow skis in the sense that the skis are made to accurately track in parallel fashion, a person or equipment can easily be pulled on the sled device 20. Likewise, such a rigid attachment prevents the ski edges from edging over and creating any unwanted drag against the snow. Further, because the sled device utilizes existing ski bindings, the weight placed thereon is essentially centrally located over the skis.

From the foregoing, it is believed that those skilled in the art will readily appreciate the unique features and advantages of the present invention over previous types of sleds and snow ski stretcher devices. Further, it is to be understood that while the present invention has been described in relation to a particular preferred and alternate embodiments as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

We claim:

1. A sled body with adjustable mounting apparatus for detachably mounting said body to the bindings of snow skis, said apparatus comprising:
   legs extending downwardly from said body,
   a sole plate fixed to the lower portion of each leg, and
   a toe portion on each sole plate, said toe portion being vertically adjustable with relation to its plate to be received by varying dimensioned ski bindings.

2. A sled body with adjustable mounting apparatus for detachably mounting said body to the bindings of snow skis, said apparatus comprising:
   legs extending downwardly from said body,
   a sole plate fixed to the lower portion of each leg, said plate being adjustable lengthwise, and
   a toe portion on each sole plate, said toe portion being vertically adjustable with relation to its plate to be received by varying dimensioned ski bindings.

3. The invention of claim 2, and including a control mechanism mounted on the sled body for braking and steering the same.

4. Apparatus for detachably connecting a load-carrying body to the ski bindings of snow skis, comprising:
   support legs fixed to the underside of said body,
   a sole plate attached to the lower portion of each leg,
   each sole plate having a toe portion vertically adjustable with respect to the remainder of said plate to be received by varying dimensioned ski bindings.

5. A sled apparatus comprising:
   a load-carrying body adapted to be removably mounted on snow skis having ski bindings thereon,
   means for removably connecting said body to a ski binding, said means comprising
   a sole plate supported by a leg extending from said body, said plate being extendable and retractable lengthwise so as to engage varying sized ski bindings, and
   a toe portion on said sole plate vertically adjustable with relation to the remainder of said plate whereby the toe portion may be adjusted and fitted into varying dimensioned ski bindings.

6. A sled vehicle comprising:
   a load-carrying body, snow skis with ski bindings thereon adapted to secure and support said body,
   means for detachably connecting said body to said ski bindings, said means comprising
   a sole plate supporting said body, and
   a toe portion on said sole plate vertically adjustable with relation to the remainder of said plate whereby the toe portion may be adjusted for fitting the plate into ski bindings of different dimensions.

7. The sled vehicle of claim 6 in which the toe portion contains sockets for releasable engagement with pins on a ski binding.

8. A sled vehicle comprising:
   a load-carrying body,
   snow skis with ski bindings thereon adapted to support said body,
   means for detachably connecting said body to a ski binding, said means comprising
   a leg extending downwardly from said body,
   a sole plate fixed to the lower portion of said leg, said plate being extendable and retractable lengthwise so as to engage varying sized ski bindings, and
   a toe portion on said sole plate vertically adjustable with relation to the remainder of said plate, whereby the toe portion may be fitted into varying sized ski bindings.

9. The sled vehicle of claim 8 including a steering and braking control mechanism.

* * * * *